(12) United States Patent
Khawer et al.

(10) Patent No.: US 8,504,744 B2
(45) Date of Patent: Aug. 6, 2013

(54) LOCK-LESS BUFFER MANAGEMENT SCHEME FOR TELECOMMUNICATION NETWORK APPLICATIONS

(75) Inventors: Mohammad R. Khawer, Lake Hopatcong, NJ (US); Lina So, East Brunswick, NJ (US)

(73) Assignee: Alcatel Lucent, Paris (FR)

(*) Notice: Subject to any disclaimer, the term of this patent is extended or adjusted under 35 U.S.C. 154(b) by 0 days.

(21) Appl. No.: 12/914,135

(22) Filed: Oct. 28, 2010

(65) Prior Publication Data

US 2012/0110223 A1 May 3, 2012

(51) Int. Cl.
*G06F 3/00* (2006.01)
*G06F 5/00* (2006.01)

(52) U.S. Cl.
USPC .................. 710/56; 710/52; 710/36

(58) Field of Classification Search
USPC .............................. 710/56, 52, 36
See application file for complete search history.

(56) References Cited

U.S. PATENT DOCUMENTS

| | | | |
|---|---|---|---|
| 5,913,230 A * | 6/1999 | Richardson | ........ 711/203 |
| 6,735,620 B1 | 5/2004 | Blackmore et al. | |
| 6,799,200 B1 | 9/2004 | Blackmore et al. | |
| 7,089,289 B1 | 8/2006 | Blackmore et al. | |
| 7,571,440 B2 | 8/2009 | Vessey et al. | |
| 7,620,753 B1 | 11/2009 | Beaman et al. | |
| 7,953,915 B2 | 5/2011 | Ge et al. | |
| 8,024,417 B2 | 9/2011 | Mehrotra | |
| 8,059,532 B2 | 11/2011 | Riddle et al. | |
| 8,099,546 B2 | 1/2012 | Rostedt | |
| 8,271,996 B1 | 9/2012 | Gould et al. | |

| | | |
|---|---|---|
| 2002/0087710 A1 | 7/2002 | Aiken et al. |
| 2004/0062246 A1 | 4/2004 | Boucher et al. |
| 2004/0187117 A1 | 9/2004 | Orion et al. |
| 2005/0008011 A1 | 1/2005 | Georgiou et al. |
| 2006/0041737 A1 | 2/2006 | Kumagai |
| 2008/0002681 A1 | 1/2008 | Bajic et al. |
| 2008/0002702 A1 | 1/2008 | Bajic et al. |

(Continued)

FOREIGN PATENT DOCUMENTS

| | | |
|---|---|---|
| EP | 1 788 491 | 5/2007 |
| WO | WO 01/63416 | 8/2001 |
| WO | WO 2005/098623 | 10/2005 |
| WO | WO 2008/005793 | 1/2008 |

OTHER PUBLICATIONS

'Emerson Network Power AMC-9210 AdvancedMC Module Preliminary Data Sheet', Jun. 1, 2008, pp. 1-3, http://www.powerbridge.de/download/dat.
International Search Report dated Jan. 12, 2012.

(Continued)

*Primary Examiner* — Idriss N Alrobaye
*Assistant Examiner* — Zachary K Huson
(74) *Attorney, Agent, or Firm* — Fay Sharpe LLP (57) ABSTRACT

A buffer management mechanism in a multi-core processor for use on a modem in a telecommunications network is described herein. The buffer management mechanism includes a buffer module that provides buffer management services for one or more Layer 2 applications, wherein the buffer module at least provides a user space application interface to application software running in user space. The buffer management mechanism also includes a buffer manager that manages a plurality of separate pools of tokens, wherein the tokens comprise pointers to memory areas in external memory. In addition, the buffer management mechanism includes a custom driver that manages Data Path Acceleration Architecture (DPAA) resources including buffer pools and frame queues to be used for user plane data distributing.

27 Claims, 4 Drawing Sheets

U.S. PATENT DOCUMENTS

| | | |
|---|---|---|
| 2008/0276056 A1 | 11/2008 | Giacomoni et al. |
| 2009/0055826 A1 | 2/2009 | Bernstein et al. |
| 2009/0080369 A1 | 3/2009 | Uminski et al. |
| 2009/0097397 A1 | 4/2009 | de Souza |
| 2009/0228890 A1 | 9/2009 | Vaitovirta et al. |
| 2009/0248934 A1 | 10/2009 | Ge et al. |
| 2010/0295859 A1* | 11/2010 | Stauffer et al. ............... 345/531 |
| 2010/0318996 A1 | 12/2010 | Harris et al. |
| 2012/0028636 A1 | 2/2012 | Khawer et al. |
| 2012/0093047 A1 | 4/2012 | Khawer et al. |
| 2012/0120965 A1 | 5/2012 | Khawer et al. |
| 2012/0131376 A1 | 5/2012 | Khawer et al. |
| 2012/0134320 A1 | 5/2012 | Khawer et al. |
| 2013/0017854 A1 | 1/2013 | Khawer |

OTHER PUBLICATIONS

Freescale Semiconductor; QorIQ™ P4080 Communcations Processor Product Brief; Sep., 2008; Freescale Semiconductor, Inc.; Rev. 1; pp. 2-5, 14-15, 19-22, 28-29.

RapidIO Trade Association; RapidIO™ Interconnect Specification; Jun. 2002; RapidIO# Trade Association; Rev. 1.2; p. II-10.

Siu, Sam, "An Introduction to the QorIQ™ Data Path Acceleration Architecture (DPAA)"; Jun. 23, 2010; Freescale Semiconductor, Inc; FTF-NET-F0444; pp. 1-21.

Wang, Shrek; An Introduction to the QorIQ™ Data Path Acceleration Architecture (DPAA); Aug. 2009; Freescale Technology Forum; 1-12.

US 6,014,703, 01/2000, McCrory et al. (withdrawn)

* cited by examiner

LOCK-LESS BUFFER MANAGEMENT SCHEME FOR TELECOMMUNICATION NETWORK APPLICATIONS

BACKGROUND OF THE INVENTION

The exemplary embodiments of the invention relate to a lock-less buffer management scheme for multi-cell support on a single modem board using a multi-core processor. While the invention is particularly directed to the art of wireless telecommunications, and will be thus described with specific reference thereto, it will be appreciated that the invention may have usefulness in other fields and applications.

By way of background, LTE (Long Term Evolution) is a rapidly evolving 3GPP project that aims to improve the UMTS (Universal Mobile Telecommunications System) mobile phone standard to cope with future communication network demands. LTE improves wireless network efficiency and bandwidth, lower costs and enhance services experience. Specifically, LTE makes use of new spectrum opportunities and offer better integration with other open standards. LTE generally includes an LTE RAN (Radio Access Network) (also known as E-UTRAN) along with an EPS (Evolved Packet System, also called Evolved Packet Core).

Communication systems are generally split into two primary functions: data plane functions and control plane functions. In previous LTE products, at least two processors were used on the modem board: one to support the control plane functions (non-real time, e.g., Operations, Administration, and Management (or OA&M), and call processing management-related functionalities), and another to terminate and support the data plane functions (real time, e.g., LTE Layer 2 processing). Both the control and data planes used different operating system (OS) instances, such as Linux for the control plane and a real-time OS such as vXWorks (made and sold by Wind River Systems of Alameda, Calif.) for the data plane core. Typically, one modem board supports one sector or cell. So to support multi-cell (e.g., 3-cells or 6-cells) configurations, it would be necessary to provide as many modem boards as the number of cells.

A multi-core processor may be used in an LTE wireless base station on a modem board. An operating system such as SMP Linux with PREEMPT_RT patch running on one SMP partition that contains all eight cores. In this configuration the control plane (non-real time threads/processes) and the data plane (real time threads/processes) share the same operating system instances even though they are bound to run on different cores.

Thus, there is a need for a buffer management scheme that is lock-less, otherwise unbounded latency spikes may result. Such a situation could seriously jeopardize or break down the LTE Layer 2 real-time processing needs. In an SMP environment, a lock taken by a non-real-time process or thread on one core may cause a latency spike for a real time thread or process waiting for that lock to be released on a different core.

SUMMARY OF THE INVENTION

Described herein is a lockless buffer management scheme in an SMP environment. The exemplary embodiments take advantage of a hardware component on the modem board such as the buffer manager (BMan) to arbitrate simultaneous access for a buffer from multiple cores. Since no software locks are taken, no process or thread will be blocked while waiting for a lock to be released. An operating system (OS) such as SMP Linux with PREEMPT_RT is not a hard core real time OS such as vxWorks. Therefore, it is important to define such a buffering scheme; otherwise, the operating system may not meet the real time processing needs of the LTE Layer 2 scheduler. From the point of view of the application software, the hardware arbitration will make it look as though all the requests for a buffer from various cores at the same time have been handled almost in parallel without any process or thread getting blocked. The result is that there are no unbounded latency spikes.

Also described herein is a zero copy buffer management scheme for SMP Linux whereby the data is sent or received by the user space application. To achieve zero copy across the user-to-kernel-space boundary, the buffer memory has to be kernel-to-user-space mapped. By allocating a contiguous chunk of memory, it makes kernel-to-user-space mapping and the seeding of the buffer pools simpler. Having a mathematical formula to compute the pointer address for a particular buffer in a specified pool makes the buffer management scheme more deterministic and robust, and it provides great help in buffer management book-keeping and garbage collection activities. This will also help in implementing efficient checks for memory corruption.

In the processing environment, a middleware layer typically hides all the hardware specific implementation details from an application layer. A core abstraction layer (CAL) provides an abstraction for the multi-core processor and its Data Path Acceleration Architecture (or DPAA). For the deployment of this modem board, the CAL provides various services, such as a zero copy lock-less buffer management scheme for LTE L2 applications, and support for the Backplane Ethernet driver (BED) interface for the Radio Link Control (RLC) Service Data Unit (SDU) transmission and reception to and from the controller board for the multi-cell configuration.

In one aspect of the present invention a buffer management mechanism in a multi-core processor for use on a modem in a telecommunications network is provided. The buffer management mechanism includes a buffer module that provides buffer management services for one or more Layer 2 applications, wherein the buffer module at least provides a user space application interface to application software running in user space. The buffer management mechanism also includes a buffer manager that manages a plurality of separate pools of tokens, wherein the tokens comprise pointers to memory areas in external memory. In addition, the buffer management mechanism includes a custom driver that manages Data Path Acceleration Architecture (DPAA) resources including buffer pools and frame queues to be used for user plane data distributing.

Optionally, the custom driver may be further operative to perform a series of functions. For example, the custom driver may acquire a contiguous chunk of the external memory. Next, the custom driver may map kernel space memory to user space to allow user mode applications access to data stored in the external memory without the need to perform data copy. The custom driver may also initialize a number of pools, a number of tokens per pool, and a size of the buffers to which the tokens point. Finally, the custom driver may seed the pools with tokens.

In another aspect of the present invention, an apparatus for providing multi-cell support in a telecommunications network is provided. The apparatus generally includes a modem board and a multi-core processor comprising a plurality of processor cores attached to the modem board. With regard to the multi-core processor, a single partition is defined with all of the processor cores included in it and wherein the single partition is used to execute all control plane functions and all data plane functions. Further, a core abstraction layer hides any core specific details from application software running on the processor cores in the single partition. The core abstraction layer suitably includes a buffer module that provides buffer management services for one or more Layer 2 applications, wherein the buffer module at least provides a user space application interface to application software running in user space. The core abstraction layer also includes a buffer manager that manages a plurality of separate pools of tokens, wherein the tokens comprise pointers to memory areas in external memory. In addition, the core abstraction layer includes a custom driver that manages Data Path Acceleration Architecture (DPAA) resources including buffer pools and frame queues to be used for user plane data distributing.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
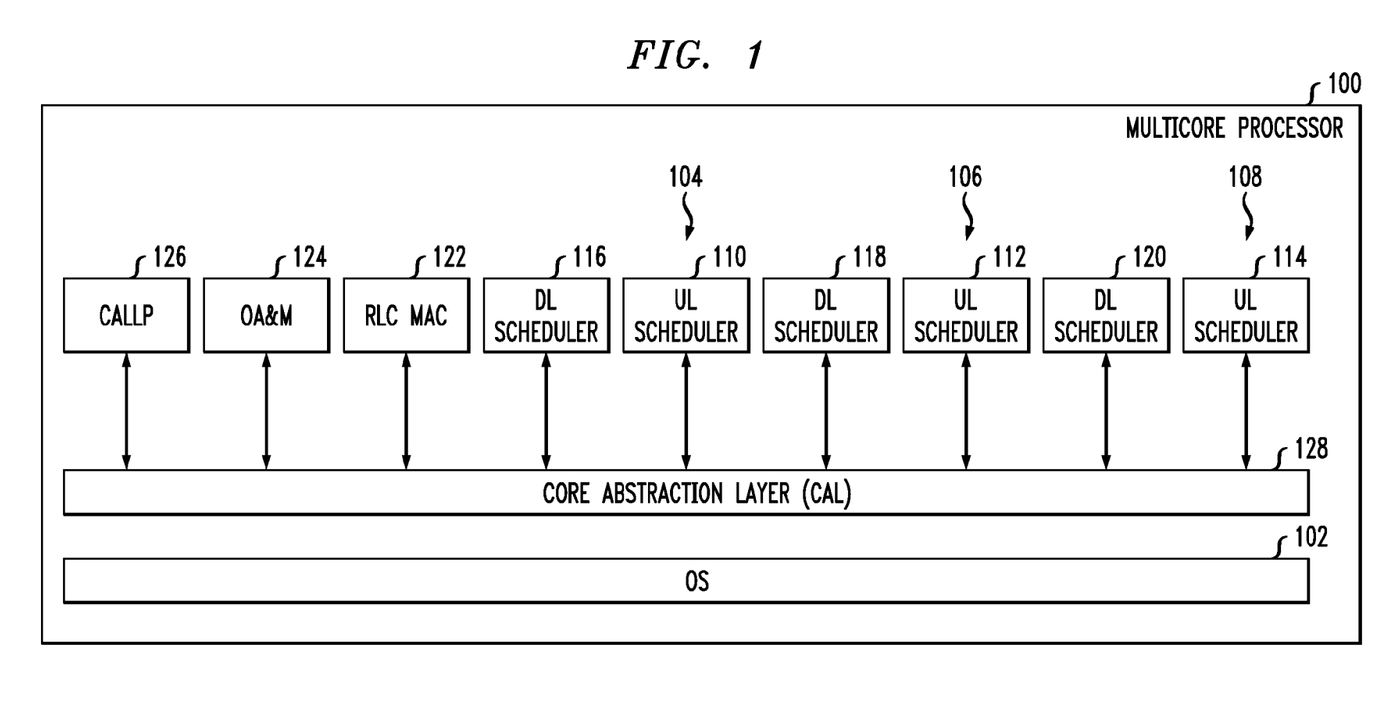
FIG. 1 illustrates one embodiment of a platform architecture in accordance with aspects of the present invention.

Referring now to the drawings wherein the showings are for purposes of illustrating the exemplary embodiments only and not for purposes of limiting the claimed subject matter, FIG. 1 provides a view of a system into which the presently described embodiments may be incorporated.

With reference now to FIG. 1, an exemplary platform architecture 100 is shown. This architecture is generally used on a modem board, but it is to be understood that it may be used in other applications. In this embodiment one partition is defined with all eight cores in it. It is to be appreciated, however, that the multi-core processor 100 may have any number of cores. With this embodiment, it is thus possible to use a single symmetric multiprocessing (SMP) operating system (OS) instance 102 that runs on all of the cores (e.g., eight cores). Since the control and data planes are under one OS instance, care is generally needed to ensure that a problem with the data plane will not bring down the control plane as well.

In this example, the multi-core processor 100 serves three cells (shown as 104, 106, and 108 in the figure). Each cell requires an uplink (UL) scheduler (shown as 110, 112, and 114 in the figure) and a downlink (DL) scheduler (shown as 116, 118, and 120 in FIG. 1).

It is known that the Radio Link Control (RLC) layer is used to segment, concatenate and correct errors on packet frames sent and received across the LTE air interface. The Radio Link Control and Medium Access Control (RLC/MAC) software is used in the GPRS (2.5G) wireless stack. It provides the acknowledged and the unacknowledged data transfer between the mobile station and the base station controller (BSC). Thus, also included is an RLC/MAC block 122, which is the basic transport unit on the air interface that is used between the mobile and the network. It is used to carry data and RLC/MAC signaling.

The multi-core processor 100 also provides Operations, Administration, and Management (OA&M) 124 and a CALLLP module 126.

In addition, the multi-core processor 100 includes a core abstraction layer (CAL) 128, which hides the core specific details from the Layer 2 (L2) application software. Layer 2 is the Data Link Layer of the seven-layer OSI model of computer networking. The Data Link Layer is the protocol layer that transfers data between adjacent network nodes in a wide area network or between nodes on the same local area network segment. The Data Link Layer provides the functional and procedural means to transfer data between network entities and might provide the means to detect and possibly correct errors that may occur in the Physical Layer. Examples of data link protocols are Ethernet for local area networks (multi-node), the Point-to-Point Protocol (PPP), HDLC and ADCCP for point-to-point (dual-node) connections. In this case, L2 generally refers to the L2 scheduler processing that is needed for the LTE air interface, which has very tight real time requirements.

To meet the real time performance needs of the base station, which is responsible for handling traffic and signaling between a mobile communication device and the network switching subsystem, an OS such as SMP Linux with PRE-EMPT_RT patch may be used. Of course, it is to be understood that other operating systems may be used. To achieve deterministic behavior in such an SMP configuration, the system is preferably implemented in a manner that employs core reservation and core affinity constructs to achieve an AMP-like system behavior. This is also desirable to get the best performance out of SMP Linux with PREEMPT_RT OS, for example. Use of lockless zero copy services, such as buffer management, and messaging services may also help address any latency issues that may be posed by the use of SMP Linux with PREEMPT_RT OS.

One of the main functions of the core abstraction layer (128) as shown in FIG. 1 is to provide high-level applications, such as L2 processing, with various services that utilize the full capabilities of the multi-core platform. The core abstraction layer is thus designed to achieve several goals. First, it should support a BED (Backplane Ethernet Driver) DPAA-Based Interface, while hiding DPAA and multi-core specific implementation from higher-level application software (i.e., L2 software). Second, it should utilize the P4080's DPAA hardware components to provide an accelerated data path for user-plane data in both the ingress and egress directions. Third, it should provide as much flexibility as possible so to easily adapt to configuration changes (i.e., without requiring code changes). An example of a CAL configuration is a DPAA resources configuration for buffer pools, ingress frame queues, and egress frame queues.

Figure 2:
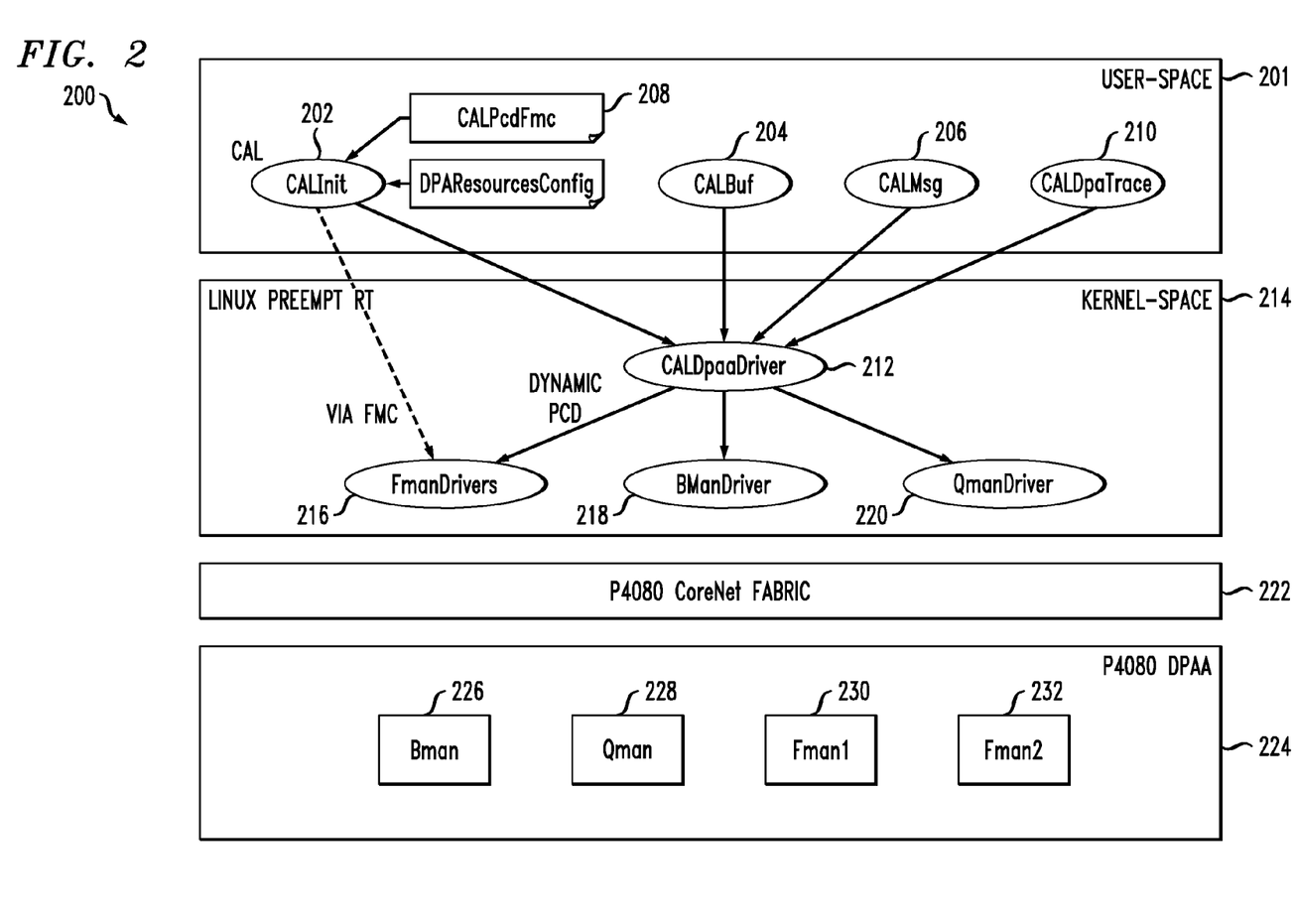
FIG. 2 illustrates an exemplary architecture for implementing the core abstraction layer shown in FIG. 1.

With reference now to FIG. 2, an exemplary architecture 200 that achieves these and other goals is shown. It is known that a conventional computer operating system usually segregates virtual memory into kernel space and user space. Kernel space is strictly reserved for running the kernel, kernel extensions, and most device drivers. In contrast, user space is the memory area where all user mode applications work and this memory can be swapped out when necessary. In this regard, a core abstraction layer (CAL) 201 includes various modules in user space, including, but not limited to: a core abstraction layer initialization (CALInit) module 202 that loads the LTE network configuration and any static PCD rules to the frame managers (FMan) 230 and 232 and sets up the CAL framework based on a set of configuration files, a core abstraction layer buffer (CALBuf) module 204, a core abstraction layer messaging (CALMsg) module 206 that provides messaging services to L2 software to send and receive user-plane data to or from another board (i.e., eCCM), a core abstraction layer parsing, classifying and distributing (CALPcdFmc) module 208 that provides Parsing, Classification and Distribution (PDC) rules and configurations to be used by each FMan (230, 232) for routing ingress frames to appropriate cores, and a core abstraction layer DPAA trace (CALDpaaTrace) module 210 that provides tracing capabilities for enabling and disabling traces in the core abstraction layer DPAA driver (CALDpaaDriver) 212, which is a kernel space module.

The architecture 200 further includes a suitable operating system 214 such as SMP Linux with Preempt RT patch. The operating system 214, in turn, supports various drivers, such as the aforementioned CALDPaa driver 212, at least one frame manager (FMan) driver 216, at least one buffer manager (BMan) driver 218, and at least one queue manager (QMan) driver 220.

As shown in FIG. 2, the architecture 200 may suitably include a P4080 CoreNet fabric 222, which is an interconnect architecture suitable for scalable on-chip network to connect multiple power architecture processing cores with caches, stand-alone caches and memory subsystems.

The P4080 processor includes an implementation of the new Data Path Acceleration Architecture (DPAA). Thus, the architecture 200 may further include a P4080 DPAA 224. The DPAA 224 is designed to optimize multicore network processing such as load spreading and sharing of resources, including network interfaces and hardware accelerators. As shown, the DPAA 224 generally includes various managers such as a BMan 226, a QMan 228, and a first and second Fman 230 and 232, respectively.

It is known that in a wireless multiple-access communication system, transmitters and receivers may communicate using a multiple layer communication stack. The layers may include, for example, a physical layer, a medium access control (MAC) layer, a radio link control (RLC) layer, a protocol layer (e.g., packet data convergence protocol (PDCP) layer), an application layer and so on. The RLC layer receives service data units (SDU) from the PDCP layer, and concatenates or segments the SDUs into RLC protocol data units (PDU) for transmission to the MAC layer.

Accordingly, the CALBuf module 204 facilitates lock-less buffer management services for L2 applications for use in the RLC SDU processing. As known in the art, a non-blocking algorithm ensures that threads competing for a shared resource do not have their execution indefinitely postponed by mutual exclusion. A non-blocking algorithm is lock-less (or lock-free) if there is guaranteed system-wide progress. The CALBuf module 204 also supports query for buffer pool statistic data (e.g., pool depletion state, depletion count, pool availability state, pool allocation error count, etc). The CALBuf module 204 interfaces with the CALDpaa driver 212 to implement the services. The CALBuf module 204 provides a lock-less buffer management scheme that is extremely critical for proper system operation in a multi-core environment, where a lock taken by a non-real time process may cause latency issues for a real time process waiting for the release of that lock.

The CALDpaaDriver 212 is the kernel space component of the CAL 201 and helps implement and provide buffer management services and messaging services using Bman and Qman APIs. As used herein, the term API (or application programming interface) refers to an interface implemented by a software program, which enables it to interact with other software. It facilitates interaction between different software programs similar to the way the user interface facilitates interaction between users and computers. An API is implemented by applications, libraries, and operating systems to determine their vocabularies and calling conventions, and is used to access their services. It may include specifications for routines, data structures, object classes, and protocols used to communicate between the consumer and the implementer of the API.

The CALDpaaDriver 212 is responsible for managing DPAA resources (buffer pools and frame queues) to be used for user-plane data distributing; providing user space interface to other CAL modules via various file operations such as open, release, i-o-control (ioctl) for initialization, buffer management, and messaging services; performing kernel-to-user-space (K-U) buffer mapping; providing DPAA buffer pool and receiver and transmitter statistical data; and implementing services for managing ring buffers. It should be noted that ring buffers represent the CAL's L2 software queue, and they are generally used to store FDs destined for a specific L2 DLT. The CALMsg module 206 provides APIs for L2 to retrieve buffer descriptors from a ring.

All of the CAL components described above are generally platform middleware (running in user space), with the exception of the CALDpaaDriver 212. The CALDpaaDriver 212 is a custom driver that runs in kernel space, and it is designed to implement and provide services needed by the CAL user space middleware—in particular those services that depend on the P4080 DPAA hardware components.

The CALBuf module 204 provides buffer management services to be used exclusively for "fast path" data processing. The CALBuf module 204 provides user space APIs to L2 application. The CALBuf module 204 collaborates with the CALDpaaDriver 212 to provide zero copy and lock-less buffer management service for buffers that the CALDpaa driver 212 creates but are managed by the Bman 226.

The CALBuf module 204 implements and provides APIs that support the following services, among others:
1. Acquiring a buffer, given a buffer size;
2. Acquiring a given number of buffers of a given size, and then returning a list of available buffers, up to the requested number of buffers;
3. Releasing a specified buffer;
4. Releasing a list of buffers; and
5. Querying for buffer pool statistics.

As stated above, a lock-less buffer management scheme is important to meet the performance needs of a multi-core processor-based modem board, which uses one partition consisting of all eight cores and runs SMP Linux with PRE-EMPT_RT. Without such a scheme the system may be subject to unbounded latency spikes, which may break down the entire system.

Figure 3:
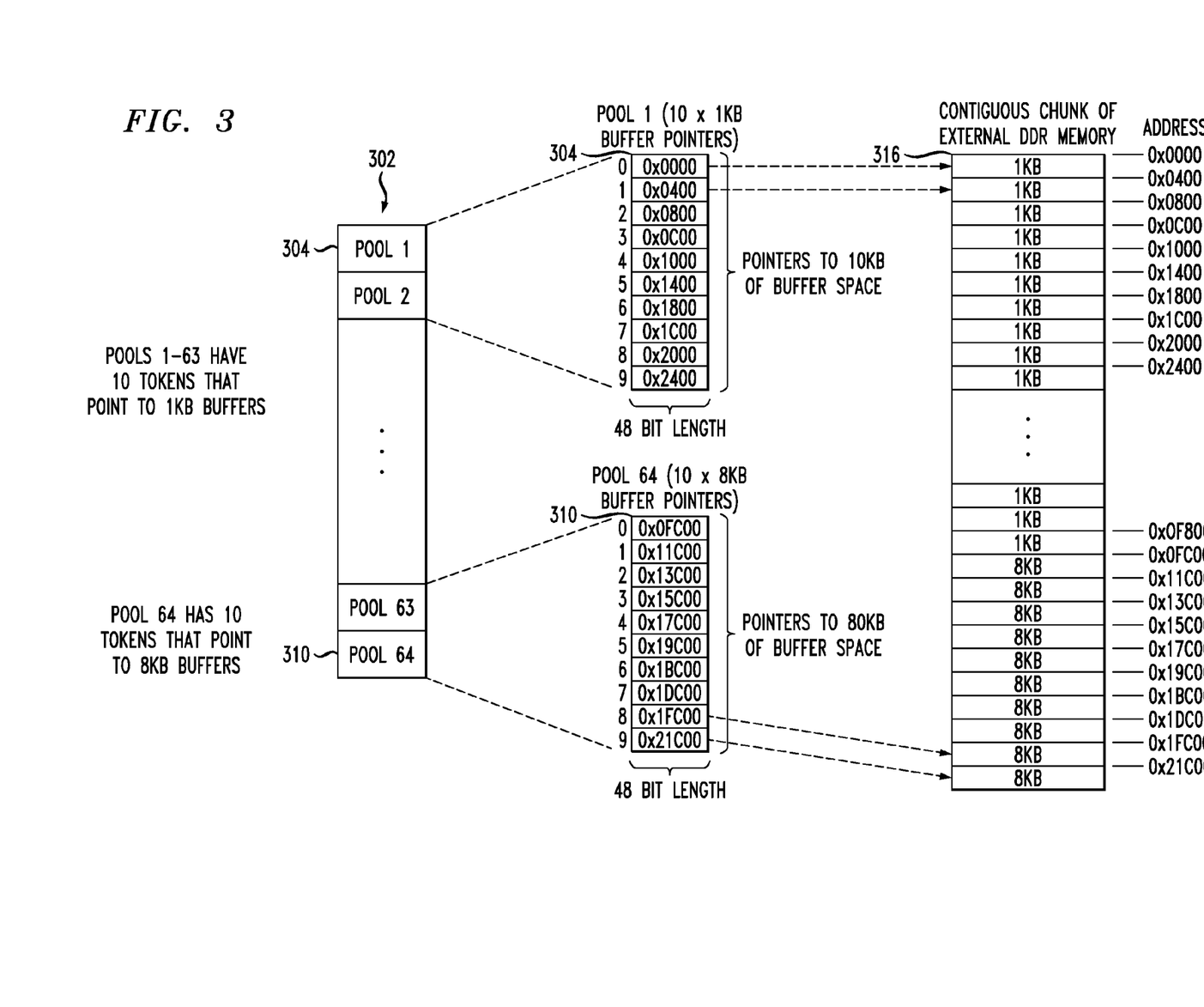
FIG. 3 illustrates an exemplary lock-less buffer management scheme for multi-cell support on a single modem board using a multi-core processor.

With reference to FIG. 3, a hardware component 302 on the multi-core processor, such as the BMan 226 or other suitable component, may be used to implement a lock-less buffer management scheme. The hardware component 302 in this example manages 64 separate pools (or queues) of 48-bit tokens. These tokens function as pointers to buffer memory. The number of pools and tokens within each pool may vary. In this regard, 64 buffer pools of different sizes (e.g., one pool may have ten tokens that point to 2 KB buffers, a second pool may have 50 tokens that point to 4 KB buffers, and so on) are defined in the hardware component 302. By way of example, the hardware component 302 may include a first pool (i.e., pool 1), shown as reference numeral 304, with ten tokens, each token pointing to a buffer in memory 1 KB (1024 bytes) in size. It is to be understood, however, that the first pool 302 may contain many more 48-bit tokens. Also in this example, the last pool (i.e., pool 64), shown as reference numeral 310, has ten tokens, each token pointing to a buffer 8 KB in size. Again, it is to be understood that the last pool 310 may contain many more 48-bit tokens. It is further noted that, although not shown in FIG. 3, the hardware component 302 has 62 remaining pools that may be of varying sizes. However, for purposes of illustration, it is assumed that each of the 62 remaining pools (i.e., pools 2-63) have ten tokens that each point to buffers of 1 KB in size.

During operation of the exemplary embodiments provided herein, the buffer management scheme sends requests to the hardware component 302 for a token (i.e., a pointer to a buffer memory) every time it needs a buffer of a certain size. This is illustrated in more detail below.

As stated earlier, the CALBuf APIS acquire a buffer. The CALBuf 212 provides a user space API to the application software running in user space. When the application needs a buffer, it invokes the CALBuf API requesting for a buffer of a certain size. The CALBuf module 204, with help from a kernel space module such as the CALDpaaDriver 212, then requests the BMan 226 for a token/buffer of the specified size. The BMan 226 is a hardware entity that arbitrates simultaneous access from multiple cores. Accordingly, the BMan 226 receives requests for a token/buffer simultaneously from multiple cores as several L2 entities are executing in parallel. The BMan 226 then performs the arbitration in hardware without the need for a software lock, and each of the requesting L2 entities receives a buffer without getting blocked. Since the hardware component 302 arbitrates simultaneous access from multiple cores, the result is a software lock-less buffer management scheme that obviates the need of a lock or a blocking semaphore in software, as described more fully below.

Initially, the CALDpaaDriver 212 allocates a contiguous chunk of memory 316 (1 GB in size, for example) in kernel space. This memory is an external DDR memory that the processor 100 uses, and it is typically co-located on the board with the processor. The hardware-assisted pools are then seeded with tokens that point to sections of memory 316 that will be used as buffers. In other words, the contiguous chunk of memory 316 contains multiple buffer pools, with each buffer pool having specific buffer size characteristics. The tokens within the 64 buffer pools (such as pools 304, 310) are used to quickly obtain an address within the memory 316 that begins a particular buffer of a certain size. The contiguous chunk of memory 316 has a start address and an end address, which together define the size and location of the chunk of memory 316.

The start address of the memory chunk 316 is used as a base pointer when calculating the seed values for the buffer pools. The seed address for any given token within a pool may be calculated by the following equation:

$$\text{Memory Address}_{x,y} = \text{Base\_Starting\_Address} + \sum_{k=1}^{x-1}(\text{Pool\_Size}_k * \text{Pool\_Buffer\_Size}_k) + ((y-1) * \text{Pool\_Buffer\_Size}_x)$$

where x is the pool number, y is the buffer (or token) number within pool x, Pool_Size is the number of tokens within pool k, and Pool_Buffer_Size is the size of each individual buffer within pool k (such as 2 KB).

For purposes of illustration, it is assumed that the start address of memory chunk 316 is 0x0000. Accordingly, using the equation above, the seed value for the first token (token 0) of the first pool (pool 1) that points to a buffer of 1 KB size is 0 (e.g., 0x000). The next token (token 1) of pool 1 is 1024 (e.g., 0x400), and so on. Assuming that pools 1-63 have ten tokens each that point to buffers of size 1 KB, and that pool 64 has ten tokens pointing to buffers of size 8 KB, the last pool (pool 64) will have a first token value (token 0) of 64,512 (e.g., 0xFC00) and the next token value (token 1) will have a value of 72704 (e.g., 0x11C00), and so on.

Once all the pools are seeded with the appropriate buffer tokens, the hardware component 302 may then assist the buffer management scheme in implementing the software lock-less buffer management scheme.

Figure 4:
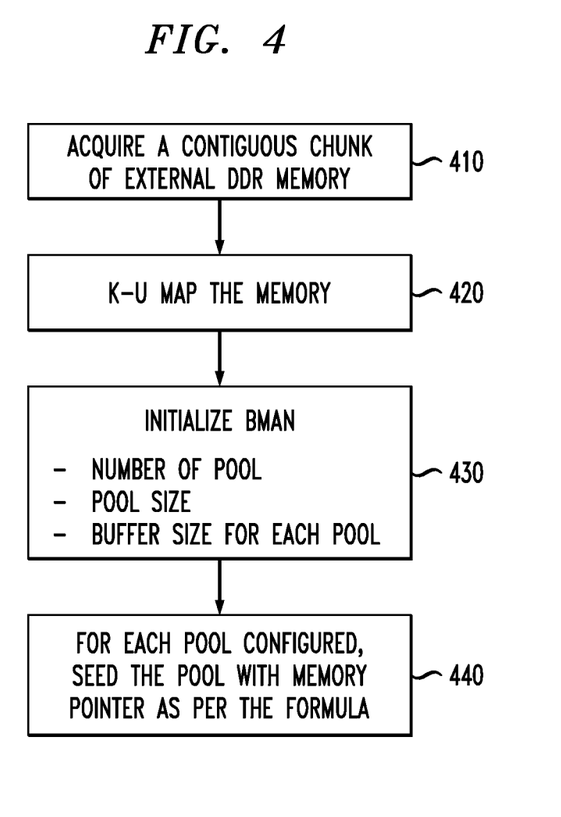
FIG. 4 shows a high-level view of the acquisition and seeding of the memory and buffer pools.

A high-level view of the acquisition and seeding of the memory 316 and buffer pools is illustrated by FIG. 4. At step 410, the CALDpaaDriver 212 acquires a contiguous chunk of external DDR memory 316 as described above.

At step 420, the CALDpaaDriver 212 maps kernel space memory 316 to user space to allow user-mode applications access to the data stored in the memory area 316 without the need to perform data copy. Due to the Linux GPL issue, the L2 Scheduler is run in user space. Therefore, the user space application will not be able to access the kernel space memory, so the memory is kernel-to-user space mapped to allow the user space application to access the buffer memory directly. This obviates the need for a data copy.

At step 430, the CALDpaaDriver 212 initializes the number of pools, the number of tokens per pool, and the size of the buffers to which the tokens point.

At step 440, the CALDpaaDriver 212 seeds the pool with tokens (memory pointers) as per the formula described with respect to FIG. 3.

In operation, whenever the buffer management scheme needs a buffer, such as when a packet arrives, the BMan 226 de-queues (i.e., takes out) a token (i.e., a pointer to a buffer memory) from the appropriate hardware pool. Similarly, when a buffer is released, the buffer management scheme en-queues (i.e., puts back) the token (i.e., a buffer memory pointer) back onto the hardware pool.

Suitably, each buffer will generally have a few bytes of header and trailer that are reserved for usage by the buffer management scheme. These headers and trailers contain important book-keeping information, such as who owns the buffer. It is to be understood that this information is needed during cell recovery to release a buffer owned by a particular process back to the hardware pool.

A person of skill in the art would readily recognize that steps of various above-described methods can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of said above-described methods. The program storage devices may be, for example, digital memories, magnetic storage media such as a magnetic disks and magnetic tapes, hard drives, or optically readable digital data storage media. The embodiments are also intended to cover computers programmed to perform said steps of the above-described methods.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. In a multi-core processor for use on a modem in a telecommunications network, a buffer management mechanism comprising:
   a buffer module that provides lock-less, zero copy buffer management services for one or more Layer 2 applications, wherein the buffer module at least provides a user space application interface to application software running in user space;
   a buffer manager that manages a plurality of separate pools of tokens, wherein the tokens comprise pointers to memory areas in external kernel space memory; and
   a custom driver that manages Data Path Acceleration Architecture (DPAA) resources including buffer pools and frame queues to be used for user plane data distributing, wherein the custom driver is further operative to provide lock-less, zero copy buffer management with pre-allocated memory for the buffer module by:
   acquiring a contiguous chunk of the external kernel space memory;
   mapping the contiguous chunk of kernel space memory to user space to allow user mode applications access to data stored in the external kernel space memory to eliminate data copy that otherwise occurs whenever data crosses a kernel-to-user-space boundary;
   initializing a number of pools, a number of tokens per pool, and a size of the buffers to which the tokens point; and
   seeding the pools with tokens, wherein a start address of the contiguous chunk of kernel space memory is used as a base pointer when calculating seed values for the buffer pools.

2. The buffer management mechanism of claim 1, wherein the buffer module is further operative to implement and provide zero copy and lock-less application programming interfaces that support one or more of the following services:
   acquiring a buffer;
   acquiring a given number of buffers of a given size and then returning a list of available buffers up to the requested number of buffers;
   releasing a specified buffer;
   releasing a list of buffers; and
   querying for buffer pool statistics.

3. The buffer management mechanism of claim 1, wherein a start address of the memory chunk is used as a base pointer when calculating seed values for the buffer pools.

4. The buffer management mechanism of claim 3, wherein the contiguous chunk of memory is pre-allocated in kernel space and mapped to user space to avoid data copy and then carved into smaller buffers for the buffer pools used by the user space application and a seed address for any given token within a pool is calculated using the following equation:

$$\text{Memory Address}_{x,y} = \text{Base\_Starting\_Address} + \sum_{k=1}^{x-1}(\text{Pool\_Size}_k * \text{Pool\_Buffer\_Size}_k) + ((y-1)*\text{Pool\_Buffer\_Size}_x)$$

where x is the pool number, y is the buffer (or token) number within pool x, Pool_Size is the number of tokens within pool k, and Pool_Buffer_Size is the size of each individual buffer within pool k.

5. The buffer management mechanism of claim 1, wherein the lock-less buffer module and the messaging module operate in user space.

6. The buffer management mechanism of claim 1, wherein the external memory operates in kernel space.

7. The buffer management mechanism of claim 1, wherein the lock-less and zero copy custom driver operates in kernel space.

8. The buffer management mechanism of claim 1, wherein the buffer manager is further operative to use lock-less hardware (DPAA) arbitration and de-queue a token from the pool after a packet arrives and, when a buffer is released, en-queue the token back onto the pool.

9. The buffer management mechanism of claim 1, wherein the buffer manager is further operative to receive requests for a buffer or token simultaneously from multiple cores and perform lock-less arbitration in hardware without the need for a software lock or a blocking semaphore in software.

10. An apparatus for providing multi-cell support in a telecommunications network, the apparatus comprising:
    a modem board; and
    a multi-core processor comprising a plurality of processor cores attached to the modem board, wherein a single partition is defined with all of the processor cores included in it and wherein the single partition is used to execute all control plane functions and all data plane functions, and a core abstraction layer that hides any core specific details from application software running on the processor cores in the single partition,
    wherein the core abstraction layer comprises at least the following modules:
    a buffer module that provides lock-less, zero copy buffer management services for one or more Layer 2 applications, wherein the buffer module at least provides a user space application interface to application software running in user space;
    a buffer manager that manages a plurality of separate pools of tokens, wherein the tokens comprise pointers to memory areas in external kernel space memory; and
    a custom driver that manages Data Path Acceleration Architecture (DPAA) resources including buffer pools and frame queues to be used for user plane data distributing, wherein the custom driver is further operative to provide lock-less, zero copy buffer management with pre-allocated memory for the buffer module by:
    acquiring a contiguous chunk of the external kernel space memory;
    mapping the contiguous chunk of kernel space memory to user space to allow user mode applications access to data stored in the external memory to eliminate data copy that otherwise occurs whenever data crosses a kernel-to-user-space boundary;
    initializing a number of pools, a number of tokens per pool, and a size of the buffers to which the tokens point; and
    seeding the pools with tokens, wherein a start address of the contiguous chunk of kernel space memory is used as a base pointer when calculating seed values for the buffer pools.

11. The apparatus of claim 10, wherein the buffer module is further operative to implement and provide zero copy and lock-less application programming interfaces that support one or more of the following services:
    acquiring a buffer;
    acquiring a given number of buffers of a given size and then returning a list of available buffers up to the requested number of buffers;
    releasing a specified buffer;
    releasing a list of buffers; and
    querying for buffer pool statistics.

12. The apparatus of claim 10, wherein a start address of the memory chunk is used as a base pointer when calculating seed values for the buffer pools.

13. The apparatus of claim 10, wherein the contiguous chunk of memory is pre-allocated in kernel space and mapped to user space to avoid data copy and then carved into smaller buffers for the buffer pools used by the user space application and a seed address for any given token within a pool is calculated using the following equation:

$$\text{Memory Address}_{x,y} = \text{Base\_Starting\_Address} + \sum_{k=1}^{x-1} (\text{Pool\_Size}_k * \text{Pool\_Buffer\_Size}_k) + ((y-1)*\text{Pool\_Buffer\_Size}_x)$$

where x is the pool number, y is the buffer (or token) number within pool x, Pool_Size is the number of tokens within pool k, and Pool_Buffer Size is the size of each individual buffer within pool k.

14. The apparatus of claim 10, wherein the lock-less buffer module and the messaging module operate in user space.

15. The apparatus of claim 10, wherein the external memory operates in kernel space.

16. The apparatus of claim 10, wherein the custom driver operates in kernel space.

17. The apparatus of claim 10, wherein the buffer manager is further operative to use lock-less hardware (DPAA) arbitration and de-queue a token from the pool after a packet arrives and, when a buffer is released, en-queue the token back onto the pool.

18. The apparatus of claim 10, wherein the buffer manager is further operative to receive requests for a buffer or token simultaneously from multiple cores and perform lock-less arbitration in hardware without the need for a software lock or a blocking semaphore in software.

19. In a multi-core processor for use on a modem in a telecommunications network, a lock-less, zero copy buffer management mechanism comprising:
a buffer module having a contiguous chunk of pre-allocated kernel to user space mapped memory that is carved into smaller buffers for buffer pools, wherein a seed address for any given buffer or token number within a pool is calculated using the following equation:

$$\text{Memory Address}_{x,y} = \text{Base\_Starting\_Address} + \sum_{k=1}^{x-1} (\text{Pool\_Size}_k * \text{Pool\_Buffer\_Size}_k) + ((y-1)*\text{Pool\_Buffer\_Size}_x)$$

where x is the pool number, y is the buffer (or token) number within pool x, Pool_Size is the number of tokens within pool k, and Pool_Buffer_Size is the size of each individual buffer within pool k;
a buffer manager that uses lock-less hardware arbitration to en-queue or de-queue a token to or from a pool when multiple requests arrive simultaneously; and
a custom kernel driver that manages Data Path Acceleration Architecture (DPAA) resources including buffer pools and frame queues to be used for user plane data distributing and is operative to initialize a number of buffer pools, a number of buffers or tokens per pool, and a size of the buffers to which the tokens point and seed the pools with tokens.

20. The buffer management mechanism of claim 19, further comprising a user space interface that allows one or more Layer 2 user space applications to acquire a buffer to send a packet on a specific communication interface.

21. The buffer management mechanism of claim 19, further comprising a kernel space interface that allows other kernel device drivers to acquire a buffer when they receive a packet on a communication interface that is destined for a user space application on a specific processing core.

22. The buffer management mechanism of claim 19, wherein the buffer manager is further operative to provide lockless, zero copy buffer management with pre-allocated memory for the buffer module by:
acquiring a contiguous chunk of the external kernel space memory; and
mapping the contiguous chunk of external kernel space memory to user space to allow the user space applications access to data stored in the external kernel space memory and eliminating the data copy that otherwise occurs whenever data crosses the kernel-to-user-space boundary.

23. The buffer management mechanism of claim 19, wherein the buffer manager is further operative to use lockless hardware (DPAA) arbitration to en-queue or de-queue a token to or from a centralized pool when simultaneous requests arrive from multiple user space layer 2 applications running on different processing cores or kernel drivers when they send or receive a packets on a communication interface, without the need for a software lock or a blocking semaphore in software.

24. The buffer management mechanism of claim 19, wherein memory needed for the buffers pools is pre-allocated as one contiguous chuck of memory that is carved into smaller buffers for the various pools and a start address of the contiguous memory chunk is used as a base pointer in the equation while calculating seed values for the buffer in the various pools.

25. The buffer management mechanism of claim 19, wherein no data copy is needed as the user space application sends or receives data over the external communication interfaces via the kernel space drivers.

26. The buffer management mechanism of claim 19, wherein the buffer is acquired by a sender and is released back to the pool by a receiver once it is done processing the packet and each of the sender and the receiver can be either a user space entity or a kernel space entity.

27. The buffer management mechanism of claim 19, wherein the external memory operates in kernel space.

* * * * *